(12) United States Patent
Guarr et al.

(10) Patent No.: US 8,885,242 B2
(45) Date of Patent: Nov. 11, 2014

(54) VARIABLE TRANSMISSION ELECTROCHROMIC WINDOW AND ASSOCIATED AIRCRAFT WINDOW SYSTEM

(71) Applicant: Gentex Corporation, Zeeland, MI (US)

(72) Inventors: Thomas F. Guarr, Holland, MI (US); David A. Theiste, Byron Center, MI (US); Kevin L. Ash, Grand Rapids, MI (US); David I. Driscoll, Caledonia, MI (US); Henry A. Luten, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 14/251,121

(22) Filed: Apr. 11, 2014

(65) Prior Publication Data
US 2014/0268289 A1 Sep. 18, 2014

Related U.S. Application Data

(63) Continuation of application No. 13/351,643, filed on Jan. 17, 2012, now Pat. No. 8,736,943.

(51) Int. Cl.
*G02F 1/153* (2006.01)
*G02F 1/15* (2006.01)

(52) U.S. Cl.
CPC ...... *G02F 1/1506* (2013.01); *G02F 2001/1512* (2013.01); *G02F 2001/1515* (2013.01)
USPC ......................................... 359/273

(58) Field of Classification Search
USPC ......................................... 359/273
See application file for complete search history.

(56) References Cited

U.S. PATENT DOCUMENTS

| 4,297,401 A | 10/1981 | Chern et al. |
| 4,418,102 A | 11/1983 | Ferrato |
| 4,695,490 A | 9/1987 | McClelland et al. |
| 4,902,108 A | 2/1990 | Byker |
| 5,596,023 A | 1/1997 | Tsubota et al. |
| 5,596,024 A | 1/1997 | Horie et al. |
| 5,805,330 A | 9/1998 | Byker et al. |
| 5,928,572 A | 7/1999 | Tonar et al. |
| 5,940,201 A | 8/1999 | Ash et al. |

(Continued)

FOREIGN PATENT DOCUMENTS

| WO | WO-98/38476 | 9/1998 |
| WO | WO-98/42796 | 10/1998 |

OTHER PUBLICATIONS

Non-Final Office Action in U.S. Appl. No. 13/351,643 dtd Sep. 12, 2013 (9 pages).

(Continued)

*Primary Examiner* — James Jones
(74) *Attorney, Agent, or Firm* — Foley & Lardner LLP; Scott P. Ryan

(57) ABSTRACT

A variable transmission electrochromic window including: first and second substantially transparent substrates having electrically conductive materials associated therewith; an electrochromic medium contained within a chamber positioned between the first and second substrates which includes at least one solvent, at least one anodic electroactive material, at least one cathodic electroactive material, and wherein at least one of the anodic and cathodic electroactive materials is electrochromic; and wherein the electrochromic window exhibits an $E_v$ of less than approximately 20, and more preferably less than approximately 5, while in a low transmission state during normal daylight conditions.

21 Claims, 11 Drawing Sheets

(56) References Cited

U.S. PATENT DOCUMENTS

| | | | |
|---|---|---|---|
| 5,998,617 | A | 12/1999 | Srinivasa et al. |
| 6,020,987 | A | 2/2000 | Baumann et al. |
| 6,037,471 | A | 3/2000 | Srinivasa et al. |
| 6,039,390 | A | 3/2000 | Agrawal et al. |
| 6,045,643 | A | 4/2000 | Byker et al. |
| 6,130,448 | A | 10/2000 | Bauer et al. |
| 6,137,620 | A | 10/2000 | Guarr et al. |
| 6,141,137 | A | 10/2000 | Byker et al. |
| 6,157,480 | A | 12/2000 | Anderson et al. |
| 6,170,956 | B1 | 1/2001 | Rumsey et al. |
| 6,188,505 | B1 | 2/2001 | Lomprey et al. |
| 6,193,378 | B1 | 2/2001 | Tonar et al. |
| 6,193,912 | B1 | 2/2001 | Thieste et al. |
| 6,195,193 | B1 | 2/2001 | Anderson et al. |
| 6,239,898 | B1 | 5/2001 | Byker et al. |
| 6,241,916 | B1 | 6/2001 | Claussen et al. |
| 6,242,602 | B1 | 6/2001 | Giri et al. |
| 6,248,263 | B1 | 6/2001 | Tonar et al. |
| 6,249,369 | B1 | 6/2001 | Theiste et al. |
| 6,262,832 | B1 | 7/2001 | Lomprey et al. |
| 6,268,950 | B1 | 7/2001 | Ash et al. |
| 6,288,825 | B1 | 9/2001 | Byker et al. |
| 6,310,714 | B1 | 10/2001 | Lomprey et al. |
| 6,351,328 | B1 | 2/2002 | Byker |
| 6,353,493 | B1 | 3/2002 | Guarr et al. |
| 6,362,914 | B2 | 3/2002 | Baumann et al. |
| 6,392,783 | B1 | 5/2002 | Lomprey et al. |
| 6,407,468 | B1 | 6/2002 | LeVesque et al. |
| 6,407,847 | B1 | 6/2002 | Poll et al. |
| 6,433,914 | B1 | 8/2002 | Lomprey et al. |
| 6,445,486 | B1 * | 9/2002 | Lomprey et al. ............. 359/265 |
| 6,447,123 | B2 | 9/2002 | Tonar et al. |
| 6,467,919 | B1 | 10/2002 | Rumsey et al. |
| 6,486,998 | B2 | 11/2002 | Lomprey et al. |
| 6,493,128 | B1 | 12/2002 | Agrawal et al. |
| 6,496,294 | B2 | 12/2002 | Lomprey et al. |
| 6,496,295 | B1 | 12/2002 | Wittwer et al. |
| 6,525,861 | B1 | 2/2003 | Roberts et al. |
| 6,545,794 | B2 | 4/2003 | Ash et al. |
| 6,560,004 | B2 | 5/2003 | Theiste et al. |
| 6,561,460 | B2 | 5/2003 | Rukavina et al. |
| 6,567,708 | B1 | 5/2003 | Bechtel et al. |
| 6,594,066 | B2 | 7/2003 | Lomprey et al. |
| 6,594,067 | B2 | 7/2003 | Poll et al. |
| 6,597,489 | B1 | 7/2003 | Guarr et al. |
| 6,606,184 | B2 | 8/2003 | Guarr et al. |
| 6,614,578 | B2 | 9/2003 | Giri et al. |
| 6,616,312 | B2 | 9/2003 | Carter |
| 6,635,194 | B2 | 10/2003 | Kloeppner et al. |
| 6,657,767 | B2 | 12/2003 | Bonardi et al. |
| 6,661,559 | B2 | 12/2003 | Byker et al. |
| 6,671,080 | B2 | 12/2003 | Poll et al. |
| 6,697,185 | B2 | 2/2004 | Lomprey et al. |
| 6,700,692 | B2 | 3/2004 | Tonar et al. |
| 6,700,693 | B2 | 3/2004 | Roberts et al. |
| 6,710,906 | B2 | 3/2004 | Guarr et al. |
| 6,714,334 | B2 | 3/2004 | Tonar |
| 6,735,011 | B2 | 5/2004 | Lomprey et al. |
| 6,778,311 | B2 | 8/2004 | Roberts et al. |
| 6,783,099 | B2 | 8/2004 | Rukavina et al. |
| 6,789,906 | B2 | 9/2004 | Tonar et al. |
| 6,816,297 | B1 | 11/2004 | Tonar et al. |
| 6,829,511 | B2 | 12/2004 | Bechtel et al. |
| 6,842,276 | B2 | 1/2005 | Poll et al. |
| 6,876,477 | B2 | 4/2005 | Lomprey et al. |
| 6,876,478 | B2 | 4/2005 | Lomprey et al. |
| 6,876,479 | B1 | 4/2005 | Giri et al. |
| 6,934,067 | B2 | 8/2005 | Ash et al. |
| 6,972,888 | B2 | 12/2005 | Poll et al. |
| 6,991,339 | B2 | 1/2006 | Tonar et al. |
| 7,001,540 | B2 | 2/2006 | Kloeppner et al. |
| 7,008,069 | B2 | 3/2006 | Ostreko et al. |
| 7,031,043 | B2 | 4/2006 | Roberts et al. |
| 7,031,044 | B2 | 4/2006 | Roberts et al. |
| 7,046,418 | B2 | 5/2006 | Lin et al. |
| 7,075,697 | B2 | 7/2006 | Giri et al. |
| 7,085,609 | B2 | 8/2006 | Bechtel et al. |
| 7,154,657 | B2 | 12/2006 | Poll et al. |
| 7,190,505 | B1 | 3/2007 | Stray et al. |
| 7,193,764 | B2 | 3/2007 | Lin et al. |
| 7,256,924 | B2 | 8/2007 | Guarr et al. |
| 7,265,888 | B2 | 9/2007 | Lomprey et al. |
| 7,334,922 | B2 | 2/2008 | Bonardi et al. |
| 7,372,609 | B2 | 5/2008 | Lin et al. |
| 7,372,611 | B2 | 5/2008 | Tonar et al. |
| 7,414,770 | B2 | 8/2008 | Ash et al. |
| 7,428,091 | B2 | 9/2008 | Baumann et al. |
| 7,450,291 | B2 | 11/2008 | Guarr et al. |
| 7,502,156 | B2 | 3/2009 | Tonar et al. |
| 7,508,568 | B2 | 3/2009 | Lin et al. |
| 7,525,714 | B2 | 4/2009 | Poll et al. |
| 7,535,614 | B1 | 5/2009 | Tapley et al. |
| 7,542,809 | B2 | 6/2009 | Bechtel et al. |
| 7,679,809 | B2 | 3/2010 | Tonar et al. |
| 7,684,103 | B2 | 3/2010 | Ash et al. |
| 7,688,495 | B2 | 3/2010 | Tonar et al. |
| 7,803,285 | B2 | 9/2010 | Zhang |
| 7,822,490 | B2 | 10/2010 | Bechtel et al. |
| 7,835,059 | B2 | 11/2010 | Giri et al. |
| 7,855,821 | B2 | 12/2010 | Baumann et al. |
| 7,884,995 | B2 | 2/2011 | Tonar et al. |
| 7,916,380 | B2 | 3/2011 | Tonar et al. |
| 7,990,603 | B2 | 8/2011 | Ash et al. |
| 2002/0015214 | A1 | 2/2002 | Nishikitani et al. |
| 2010/0215903 | A1 | 8/2010 | Tonar et al. |
| 2011/0002028 | A1 | 1/2011 | Luten et al. |
| 2011/0176195 | A1 | 7/2011 | Veenman et al. |
| 2011/0255142 | A1 | 10/2011 | Ash et al. |

OTHER PUBLICATIONS

Notice of Allowance in U.S. Appl. No. 13/351,643 dtd Feb. 20, 2014 (8 pages).

* cited by examiner

VARIABLE TRANSMISSION ELECTROCHROMIC WINDOW AND ASSOCIATED AIRCRAFT WINDOW SYSTEM

CROSS-REFERENCE TO RELATED PATENT APPLICATIONS

This application is a Continuation of U.S. patent application Ser. No. 13/351,643, filed Jan. 17, 2012, incorporated herein by reference in its entirety.

BACKGROUND OF THE INVENTION

The present invention relates in general to variable transmission electrochromic windows and, more particularly, to variable transmission electrochromic windows and associated aircraft window systems which are capable of reducing illuminance from more than approximately 70,000 lux in a high transmission state to less than approximately 5 lux while in a low transmission state during normal daylight conditions.

Variable transmission electrochromic windows and associated aircraft window systems have recently become commercially available. While such variable transmission electrochromic windows and associated aircraft window systems have become increasingly popular, limitations relative to their low transmission state during normal daylight conditions remain problematic. In particular, even when the variable transmission electrochromic window of an aircraft window system is in its darkened or low transmission state, some sensitive observers, trying to sleep on long flights during the day, may complain that the sun remains bright enough to adversely affect sleep or be otherwise bothersome.

It has now been surprisingly discovered that selective utilization of anodic and/or cathodic compounds within the electrochromic medium of the variable transmission electrochromic window enables an associated aircraft window system to exhibit reduced illuminance to less than approximately 5 lux while in a low transmission state during normal daylight conditions—which is almost an order of magnitude in reduction relative to current commercially available variable transmission electrochromic windows.

It is therefore an object of the present invention, among other objects, to provide a variable transmission electrochromic window and associated aircraft window system that remedy the aforementioned low transmission state limitations of present technology variable transmission electrochromic windows.

These and other objects of the present invention will become apparent in light of the present specification, claims, and appended drawings.

SUMMARY OF THE INVENTION

The present invention is preferably directed to a variable transmission electrochromic window comprising: (a) a first substantially transparent substrate having an electrically conductive material associated therewith; (b) a second substantially transparent substrate having an electrically conductive material associated therewith; (c) an electrochromic medium contained within a chamber positioned between the first and second substrates which comprises: (1) one or more solvents; (2) one or more anodic electroactive materials; (3) one or more cathodic electroactive materials; and (4) wherein at least one of the anodic and cathodic electroactive materials is electrochromic; and (d) wherein the electrochromic window exhibits a lux ($E_v$) of less than approximately 20 while in a low transmission state during normal daylight conditions. It will be understood that photometric quantities are denoted with a suffix "v" to avoid confusion with radiometric or photonic quantities. It will be further understood that the lux values measured behind the window of the present invention were achieved under normal daylight conditions.

More preferably, the electrochromic window (e.g., an aircraft window) exhibits an $E_v$ of less than approximately 10 while in a low transmission state during normal daylight conditions, and yet more preferably exhibits an $E_v$ of less than approximately 5 while in a low transmission state during normal daylight conditions.

The present invention is also preferably directed to a variable transmission electrochromic window, comprising: (a) a first substantially transparent substrate having an electrically conductive material associated therewith; (b) a second substantially transparent substrate having an electrically conductive material associated therewith; (c) an electrochromic medium contained within a chamber positioned between the first and second substrates which comprises: (1) at least one solvent; (2) a first anodic electroactive material; (3) a second anodic electroactive material; (4) at least one cathodic electroactive material; and (5) wherein at least one of the anodic and cathodic electroactive materials is electrochromic; and (d) wherein the electrochromic window exhibits an $E_v$ of less than approximately 20, and more preferably less than approximately 10, and yet more preferably less than approximately 5, while in a low transmission state during normal daylight conditions.

In a preferred embodiment of the present invention, the electrochromic medium further comprises an anodic and/or cathodic color-stabilizing redox buffer. Examples of suitable anodic and cathodic redox buffers include, but are not limited to, metallocenes (e.g., substituted ferrocenes) having different oxidation states.

In another preferred embodiment of the present invention, the concentration of the one or more cathodic electroactive materials is greater than the combined concentration of the first and second anodic electroactive materials.

In yet another preferred embodiment of the present invention, the cathodic electroactive material comprises a viologen, such as, but not limited to, a 1,1'-dialkyl-4,4'-dipyridinium compound, wherein at least one alkyl group attached to the dipyridinium compound comprises at least 4 carbon atoms and includes less than 2 β hydrogen atoms.

In another aspect of the present invention, the first and/or second anodic electroactive material comprises a phenazine, such as, but not limited to, a 5,10-dialkyl-5,10-dihydrophenazine compound, wherein at least one alkyl group attached to the phenazine compound comprises at least 4 carbon atoms and includes less than 2 β hydrogen atoms, and more preferably is void of any β hydrogen atoms. In this embodiment the phenazine preferably comprises one or more neopentyl groups.

In accordance with the present invention, the electrochromic medium may further comprise a cross-linked polymer matrix, a free-standing gel, and/or a substantially non-weeping gel.

The present invention is yet further preferably directed to an aircraft window system comprising a housing for containing: (a) a first substantially transparent interior substrate; (b) a second substantially transparent exterior substrate; and (c) a variable transmission electrochromic window positioned between the interior and exterior substrates, wherein the variable transmission electrochromic window comprises: (1) a third substantially transparent substrate having an electrically conductive material associated therewith; (2) a fourth substantially transparent substrate having an electrically conductive material associated therewith; (3) an electrochromic medium contained within a chamber positioned between the first and second substrates which comprises: (i) at least one solvent; (ii) a first anodic electroactive material; (iii) a second anodic electroactive material; (iv) at least one cathodic electroactive material; and (v) wherein at least one of the anodic and cathodic electroactive materials is electrochromic; and (4) wherein the electrochromic window exhibits an $E_v$ of less than approximately 20, and more preferably less than approximately 10, and yet more preferably less than approximately 5, while in a low transmission state during normal daylight conditions.

These and other features, advantages, and objects of the present invention will be further understood and appreciated by those skilled in the art by reference to the following specification, claims, and appended drawings.

BRIEF DESCRIPTION OF THE DRAWINGS

Certain embodiments of the present invention are illustrated by the accompanying figures. It will be understood that the figures are not to scale and that details not necessary for an understanding of the invention or that render other details difficult to perceive have been omitted for clarity. It will be further understood that the invention is not necessarily limited to the particular embodiments illustrated herein.

The invention will now be described with reference to the drawings wherein.

DETAILED DESCRIPTION OF THE PREFERRED EMBODIMENTS

Figure 1:
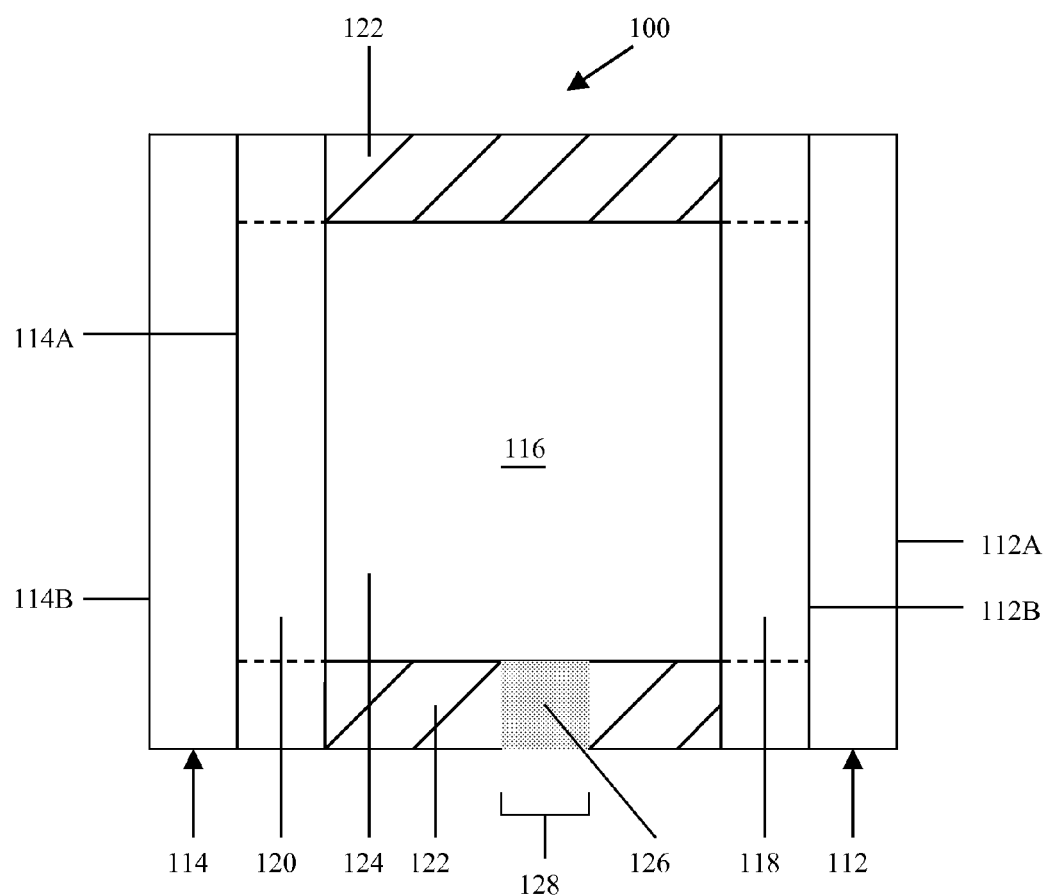
FIG. 1 of the drawings is a cross-sectional schematic representation of a variable transmission electrochromic window fabricated in accordance with the present invention showing, among other things, a plug associated with a fill port of a conventional seal member.
Figure 2:
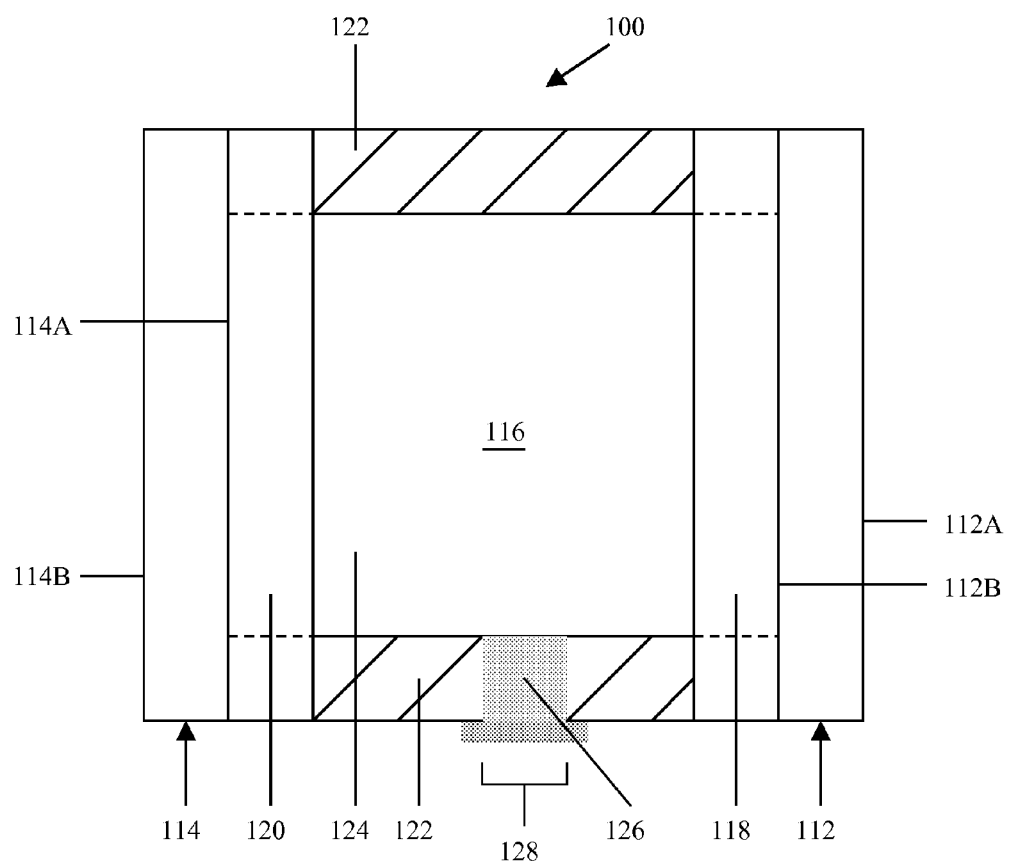
FIG. 2 of the drawings is a cross-sectional schematic representation of a variable transmission electrochromic window fabricated in accordance with the present invention showing, among other things, a two-part plug associated with a fill port of a conventional seal member.
Figure 3:
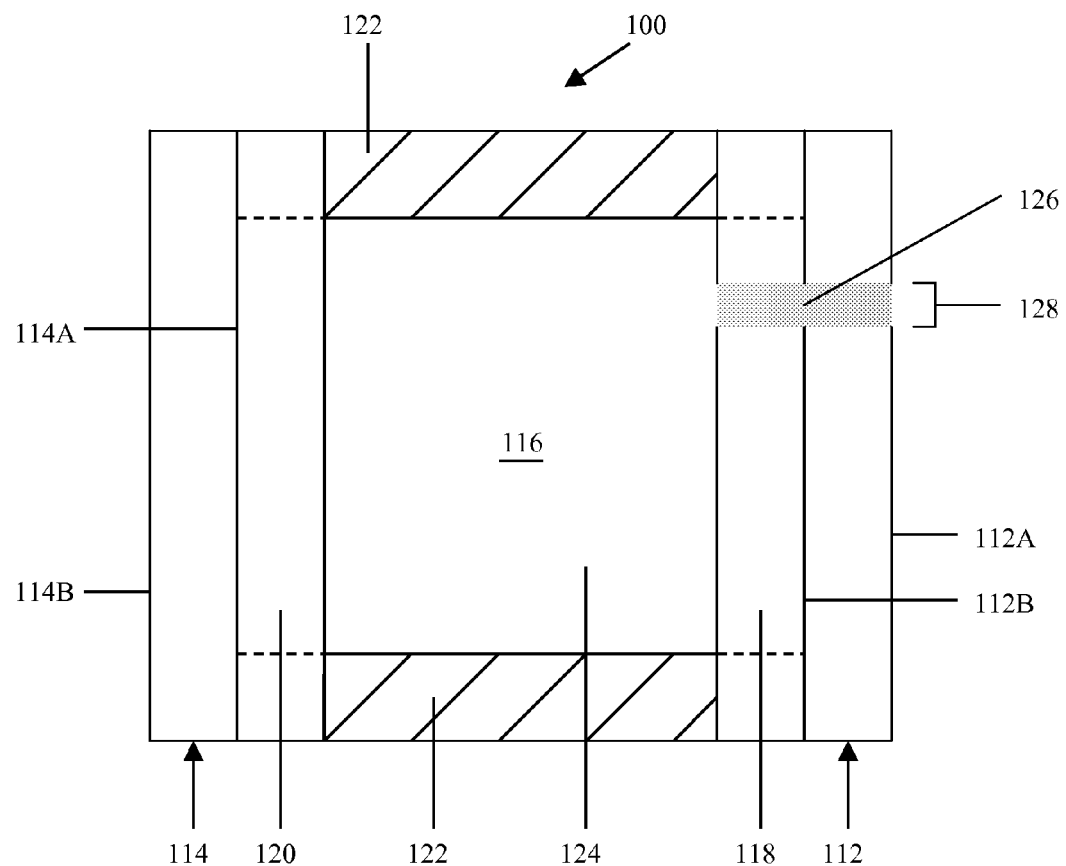
FIG. 3 of the drawings is a cross-sectional schematic representation of a variable transmission electrochromic window fabricated in accordance with the present invention showing, among other things, a plug associated with a fill port of a substrate.
Figure 4:
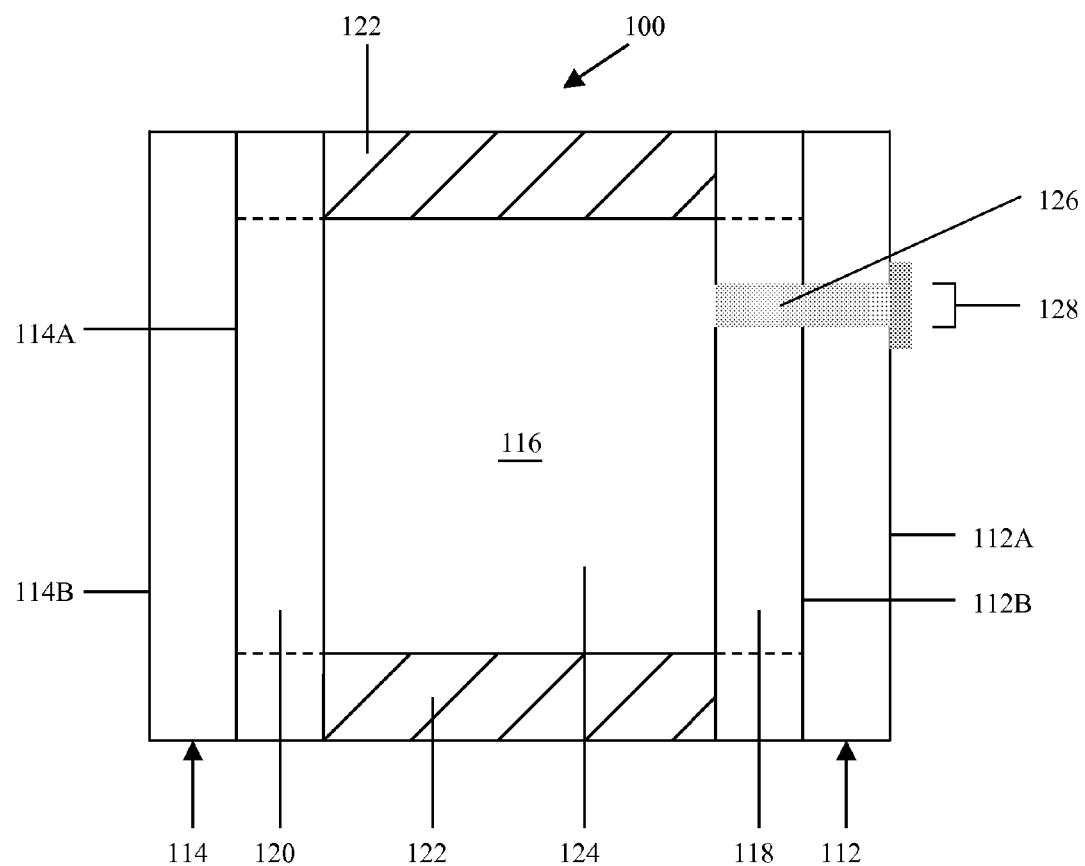
FIG. 4 of the drawings is a cross-sectional schematic representation of a variable transmission electrochromic window fabricated in accordance with the present invention showing, among other things, a two-part plug associated with a fill port of a substrate.
Figure 5:
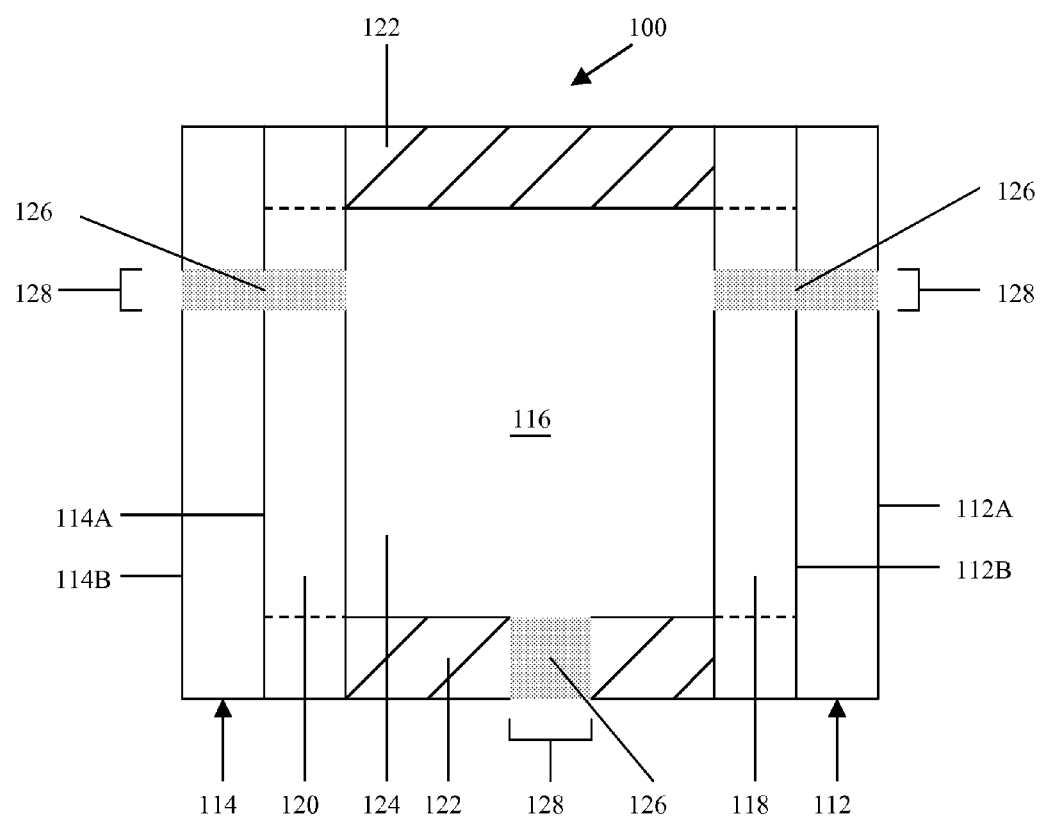
FIG. 5 of the drawings is a cross-sectional schematic representation of a variable transmission electrochromic window fabricated in accordance with the present invention showing, among other things, a plug associated with a fill port of a first substrate, a second substrate, and a seal member.
Figure 6:
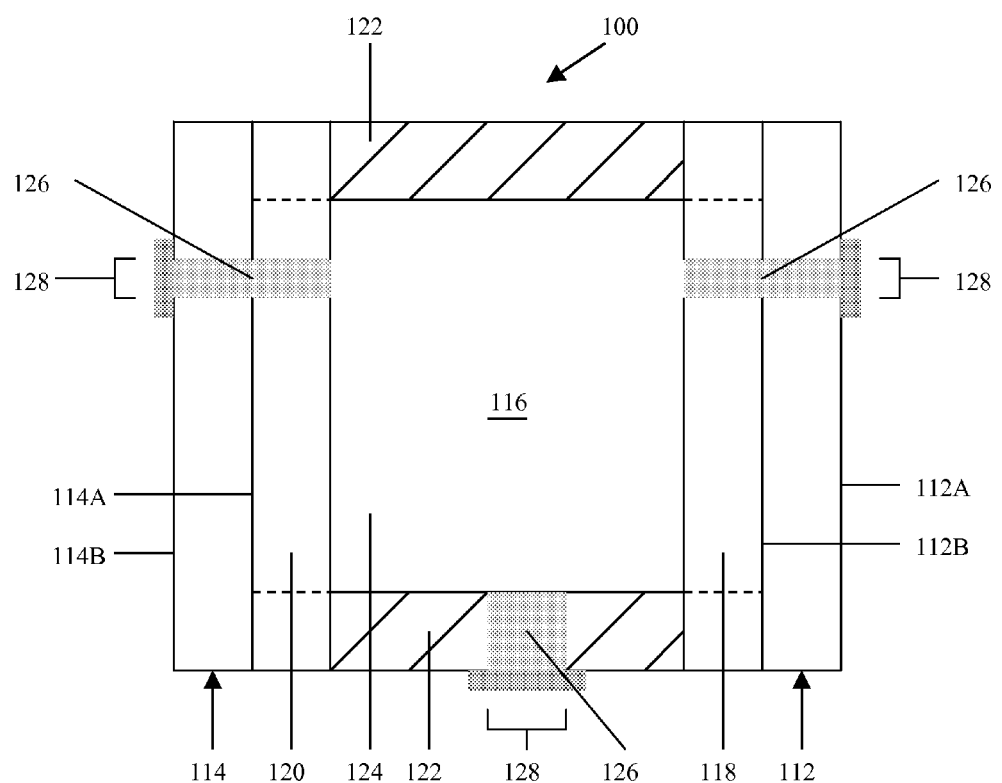
FIG. 6 of the drawings is a cross-sectional schematic representation of a variable transmission electrochromic window fabricated in accordance with the present invention showing, among other things, a two-part plug associated with a fill port of a first substrate, a second substrate, and a seal member.
Figure 7:
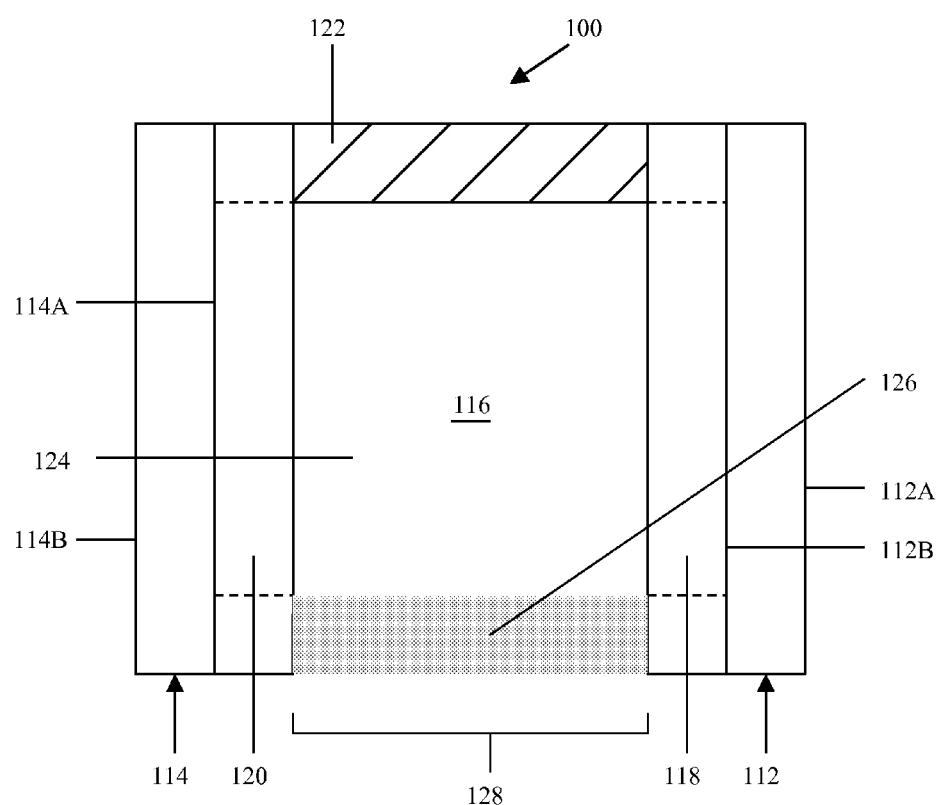
FIG. 7 of the drawings is a cross-sectional schematic representation of a variable transmission electrochromic window fabricated in accordance with the present invention showing, among other things, a plug associated with a fill port.

In accordance with the present invention, the variable transmission electrochromic windows include electrochromic mediums which selectively utilize anodic and/or cathodic compounds that enable associated aircraft window systems to exhibit an $E_v$ of less than approximately 20, and more preferably less than approximately 10, and yet more preferably less than approximately 5, while in a low transmission state during normal daylight conditions. It will be understood that regardless of its ordinary meaning the term "normal daylight conditions" will be defined herein as a clear day at approximately solar noon in lower Michigan.

Referring now to the drawings and to FIGS. 1-7 in particular, cross-sectional schematic representations of variable transmission electrochromic windows 100 are shown, which generally comprise first substrate 112 having front surface 112A and rear surface 112B, second substrate 114 having front surface 114A and rear surface 114B, chamber 116 for containing electrochromic medium 124, and one or more plugs 126 associated with one or more fill ports 128. In accordance with the present invention, electrochromic windows 100 may comprise, for illustrative purposes only, a window for a residential, commercial and/or industrial building, a vehicle, an aircraft, and the like. It will be understood that like or analogous elements and/or components, and/or methods referred to herein, may be identified throughout the drawings with like reference characters. It will be further understood that FIGS. 1-7 are merely schematic representations of electrochromic windows 100. As such, some of the components have been distorted from their actual scale for pictorial clarity. Indeed, numerous other variable transmission electrochromic window configurations, components and/or control systems are contemplated for use, including those disclosed in U.S. Pat. No. 7,990,603 entitled "Variable Transmission Window Control System," U.S. Pat. No. 7,085,609, entitled "Variable Transmission Window Constructions," U.S. Pat. No. 6,597,489 entitled "Electrode Design For Electrochromic Devices," U.S. Pat. No. 6,567,708 entitled "System To Interconnect, Link, And Control Variable Transmission Windows And Variable Transmission Window Constructions," U.S. Pat. No. 6,433,914 entitled "Color-Stabilized Electrochromic Devices," U.S. Pat. No. 6,407,847 entitled "Electrochromic Medium Having A Color Stability," U.S. Pat. No. 6,239,898 entitled "Electrochromic Structures," U.S. Pat. No. 6,137,620 entitled "Electrochromic Media With Concentration-Enhanced Stability, Process For The Preparation Thereof And Use In Electrochromic Devices," U.S. Pat. No. 5,940,201 entitled "Electrochromic Mirror With Two Thin Glass Elements And A Gelled Electrochromic Medium," U.S. Pat. No. 5,805,330 entitled "Electro-Optic Window Incorporating A Discrete Photovoltaic Device," and U.S. Patent Application Publication No. 2006/0056003 entitled "Vehicular Rearview Mirror Elements And Assemblies Incorporating These Elements,"—all of which are hereby incorporated herein by reference in their entirety including all references incorporated and/or cited therein.

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. First substrate 112 is preferably fabricated from a sheet of glass having a thickness ranging from approximately 0.10 millimeters (mm) to approximately 12.7 mm, more preferably from approximately 0.50 mm to approximately 1.50 mm, and yet more preferably from approximately 0.65 mm to approximately 1.00 mm. Of course, the thickness of the substrate will depend largely upon the particular application of the variable transmission electrochromic window. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, variable transmission electrochromic windows in accordance with the present invention can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material to help protect the substrate(s) and/or the electrochromic media from UV damage.

Second substrate 114 may be fabricated from similar materials as that of first substrate 112. Second substrate 114 is preferably fabricated from a sheet of glass or plastic having a thickness ranging from approximately 0.10 mm to approximately 12.7 mm, more preferably from approximately 0.50 mm to approximately 1.50 mm, and yet more preferably from approximately 0.65 mm to approximately 1.00 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the variable transmission electrochromic window. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the variable transmission electrochromic window or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/metal/metal oxide (wherein metal oxide can be substituted with metal carbide, metal nitride, metal sulfide, etcetera), or other materials known to those having ordinary skill in the art.

Electrically conductive material 120 is preferably associated with front surface 114A of second substrate 114, and is preferably operatively bonded to electrically conductive material 118 by sealing member 122. As can be seen in FIGS. 1-7, once bonded, sealing member 122, plug 126 and/or the juxtaposed portions of electrically conductive materials 118 and 120 serve to generally define an inner peripheral geometry of chamber 116. Alternatively, edge sealing techniques may be utilized which are disclosed in U.S. Pat. No. 7,372,611 entitled "Vehicular Rearview Mirror Elements And Assemblies Incorporating These Elements," which is hereby incorporated herein by reference in it entirety including all references incorporated and/or cited therein.

In accordance with the present invention, the cell spacing between inner surfaces of substrates 112 and 114 preferably ranges from approximately 10 microns ($\mu$m) to approximately 750 $\mu$m, and more preferably from approximately 20 $\mu$m to approximately 600 $\mu$m. However, it will be understood that the thickness of the cell spacing will depend largely upon the particular application of the variable transmission electrochromic window.

Sealing member 122 may comprise any material that is capable of being adhesively bonded to the electrically conductive materials 118 and 120 to, in turn, seal chamber 116, (in certain embodiments in cooperation with plug 126 and fill port 128, see FIGS. 1, 2, 5, and 6) so that electrochromic medium 124 does not inadvertently leak out of the chamber. As is shown in dashed lines in FIGS. 1-7, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334 entitled "Electrochromic Device Having A Seal Including An Epoxy Resin Cured With A Cycloaliphatic Amine," all of which are hereby incorporated herein by reference in their entirety including all references incorporated and/or cited therein.

For purposes of the present disclosure, and as will be explained in greater detail herein below, electrochromic medium 124 typically comprises at least one solvent, at least one anodic material (e.g., 1, 2, 3, etc.), and at least one cathodic material (e.g., 1, 2, 3, etc.).

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety including all continuing applications/patents claiming priority therefrom. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2Hbenzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Examples of anodic materials may include di-tert-butyldiethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithazinebis(tetrafluoroborate) in U.S. Pat. No. 6,710,906 B2, which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds and Associated Media and Devices," all of which are hereby incorporated herein by reference in their entirety including all references incorporated and/or cited therein.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethyl-ammonium di-tetrafluoroborate (TTBFc$^+$)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and/or cathodic materials can range from approximately 1 millimolar (mM) to approximately 500 mM and more preferably from approximately 2 mM to approximately 100 mM.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In one aspect of the present invention plug 126 is associated with fill port 128, which preferably comprises an epoxy resin or mixture of resins (or other resins provided herein) and which is at least partially cured with a cationic photoinitiating antimonate salt and/or comprises an antimonate toward enhancing durability of plug 126 and/or compatibility of the same with electrochromic medium 124 and/or external atmospheric conditions. Such enhanced durability and/or compatibility preferably reduces the likelihood of any materials within electrochromic medium 124 being compositionally compromised and/or from inadvertently leaking out of chamber 116 through fill port 128.

It will be understood that during normal fabrication of variable transmission electrochromic window 100, fill port 128 is utilized to introduce electrochromic medium 124 into chamber 116 of variable transmission electrochromic window 100. In certain embodiments (e.g., FIGS. 1 and 2) partially fabricated variable transmission electrochromic window 100 is placed with fill port 128 downward in an empty container or trough in a vacuum vessel and evacuated. Electrochromic medium 124 is introduced into the trough or container in a manner such that fill port 128 is submerged. The vacuum vessel is then backfilled, which forces electrochromic medium 124 through fill port 128 and, ultimately, into chamber 116. In certain other embodiments, (e.g., FIGS. 3 and 4) such as an aircraft transparency, partially fabricated variable transmission electrochromic window 100 is placed with fill port 128 upward in a vacuum vessel and evacuated. Electrochromic medium 124 is introduced into the container via conventional conduit. Additional discussions relative to the fabrication process of certain embodiments of variable transmission electrochromic windows 100 are disclosed in U.S. Pat. No. 6,700,692 B2, which has been previously referenced and incorporated herein.

The formulation of plug 126 may also comprise an epoxy resin or mixture of resins (e.g. cycloaliphatic epoxy resins including, for example, Omnilane 001005, which is available from IGM Resins Inc., Bartlett, Ill., aromatic epoxy resins including, for example, Bis-F, Bis-A, and/or epoxy novolac resins including, for example, DER 354, DER 332, and DEN 431, which are all available from the Dow Chemical Company—all of which may be optionally filled with fumed silica or other fillers such as glass beads, calcium carbonate, aluminum oxide, calcium fluoride, or other fillers as desired) which are at least partially cured using one or more antimonate photo initiators, such as, for example, a sulfonium antimonate, an arylsulfonium antimonate, a triarylsulfonium antimonate, a triarylsulfonium hexafluoroantimonate, and a mixed triarylsulfonium hexafluoroantimonate, and combinations thereof.

While specific anionic salts of photo initiators have been disclosed, for illustrative purposes only, it will be understood that any one of a number of other anions are contemplated for use in accordance with the present invention, including, for example, AsF$_5$, Ga(C$_6$F$_5$)$_4$, etcetera.

The formulation of plug 126 may also comprise a resin or mixture of resins (e.g., epoxy resins, such as epoxidized polybutadienes, epoxidized castor oil, epoxidized cashew nut oil, acrylated butadiene resins, among other provided herein) that are substantially insoluble and/or substantially immiscible with an associated electrochromic medium (i.e., 124) while in the uncured state. By way of supporting example, the resin or mixture of resins may comprise
Sartomer CN301, Sartomer
CN-304, Rhan BR-643.

For purposes of the present invention it will be understood that resins other than acrylated (Sartomer CN-301), methacrylated (Sartomer CN304) or epoxidized polybutabiene can be used in a plug formulation that are at least substantially insoluble and/or at least substantially immiscible in the EC media. Other insoluble monomers or oligomers available from Sartomer include CN-986 (aliphatic urethane acrylate), CN-2252 (polyester acrylate), CN-934 (aliphatic urethane acrylate), CN-975 (hexafunctional urethane acrylate), CN-965 (aliphatic urethane acrylate), CN-981 (aliphatic urethane acrylate)CN-973 (aromatic urethane acrylate), SR-489 (tridecyl acrylate) and SR-335 (lauryl acrylate)—just to name a few.

Plug 126 may also comprise two-parts, namely; a first sub-component comprising a resin or mixture of resins (e.g., epoxy resins, acrylated butadiene resins, among other provided supra and infra) that are substantially insoluble and/or substantially immiscible with an associated electrochromic medium (i.e., 124) while in the uncured state, and a second-subcomponent comprising a resin or mixture of resins (e.g., epoxy resins, urethane resins, phenolic resins, acrylic resins, cured at room temperature, thermally and/or with radiation, among other provided supra and infra) that exhibit desired permeability, adhesion, and/or stability characteristics. In particular, the permeability of the second-subcomponent will preferably protect electrochromic medium 124 from air and/or moisture if the first-subcomponents exhibits permeability to air and/or moisture. Furthermore, the second-subcomponent will preferably adhere to at least the first-subcomponent toward maintaining device integrity over long periods of time—including one or more decades depending upon the application of the particular variable transmission electrochromic window.

Additional non-limiting examples of resins that are suitable for use as second-subcomponent resins and/or resins cured with an antimonate photo initiator include conventional aliphatic amines, cycloaliphatic amines, amidoamines, mercaptans, cycloaliphatic epoxy resins such as Omnilane OC1005, which is available from IGM Resins Inc., Bartlett, Ill., aromatic epoxy resins such as Bis-F, Bis-A, and/or epoxy novolac resins such as DER 354, DER 332, and DEN 431, which are all available from the Dow Chemical Company, as well as thermal and/or photo-initiators, and optionally filled with fumed silica or other fillers such as glass beads, calcium carbonate, aluminum oxide, etcetera, using conventional techniques.

It will be understood that the first sub-component of plug 126 can be introduced into fill port 128 which is generally compatible with the components of electrochromic medium 124 and subsequently cured. Next, the outer surface of the first sub-component and surrounding area can be cleaned, or cleaned and etched, if desired, prior to association of the second sub-component. Etching can be accomplished by several methods including mechanical etching such as sandblasting, sandpaper, and chemical etching—just to name a few etching techniques. After optionally etching, the second sub-component of plug 126 can be associated with the outer surface area the first sub-component and the surrounding area which is generally compatible with external atmospheric conditions/parameters.

In accordance with the present invention, plug 126 may also optionally comprise one or more cure indicators which provide optical and/or measurable indication of the degree of plug curing. A first class of cure indicators preferably includes pH based cure indicators, such as phenolphthalein (0.25-0.5 parts per hundred resin "phr") and thymolphthalein (0.25-0.5 phr), which are available from Sigma-Aldrich Chemical Co., of St. Louis, Mo. A second class of cure indicators preferably includes free radical/reactive cure indicators such as Crystal Violet (0.25-0.5 phr), which is available from Sigma-Aldrich Chemical Co. A third class of cure indicators preferably includes UV cure indicators such as Blue 55 (1-5 phr), which is available from Spectra Group Limited, Inc., Millbury, Ohio. It will be understood that the concentrations of cure indicators provided above are merely preferred operative concentrations, but are, in no way, limiting. To be sure, other concentrations that would be known to those having ordinary skill in the art are likewise contemplated or use in accordance with the present invention. It will be further understood that utilization of plug cure indicators to the formulation is advantageous in a production setting to insure that plug 126 has been exposed to UV light and/or is in a properly cured state.

Plug 126 may further optionally comprise one or more additives, such as, but not limited to, tougheners (e.g. Fortegra 100 (1-5 wt %) available from The Dow Chemical Company and MX136 core-shell toughener (25 wt % in Bis-F epoxy) available from Kaneka Corporation, Pasedena, Tex.), flexibilizers/crosslinkers (e.g. H2003 dendritic polymer (1-20 wt %) or CAPA polyols (1-20 wt %) available from Perstorp Polyols, Inc, Toledo, Ohio), and/or surface active agents (e.g. UV3570 (0.5-2.5 wt %) available from BYK-Chemie, Germany). It will be understood that plug tougheners and flexibilizers/crosslinkers are functionally self-explanatory, and that surface active agents can reduce the surface tension of the plug formulation and help repel the electrochromic medium during the plugging operation and reduce intermixing. It will be understood that numerous other plug materials and/or configurations are contemplated for use including those disclosed in U.S. Pat. No. 7,884,995 B2 and U.S. patent application Ser. No. 13/022,912, both of which are entitled "Electrochromic Device Having an Improved Fill Port Plug," and both of which are hereby incorporated herein by reference in their entirety including all references incorporated and/or cited therein.

Figure 8:
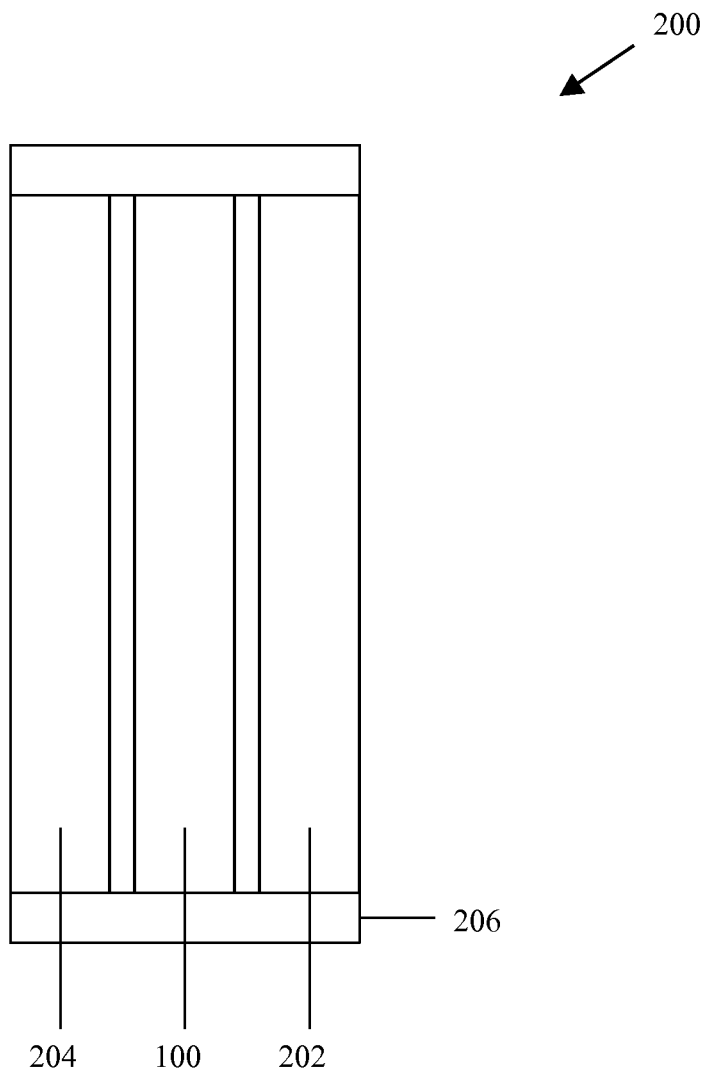
FIG. 8 of the drawings is a cross-sectional schematic representation of an aircraft window system fabricated in accordance with the present invention.

Referring now to FIG. 8, a cross-sectional schematic representation of aircraft window system 200 is shown, which generally comprises variable transmission electrochromic window 100 discussed supra, interior substrate 202, and exterior substrate 204, which are secured within housing 206. Aircraft window system 200 is suitable for application in, for example, private and commercial aircraft including, but not limited to, those manufactured by Boeing (e.g., 787) and Gulfstream (e.g., G550).

Interior substrate 202 preferably comprises a substrate fabricated from a polycarbonate resin, such as Lexan which is commercially available from numerous sources. It will be understood that substrate 202 may be fabricated from any material acceptable within the aircraft industry as an interior substrate.

Exterior substrate 204, or the primary pressure window, preferably comprises a substrate fabricated from glass, stretched acrylic or laminates thereof which are commercially available from PPG Aerospace and GKN Aerospace.

It will be understood that, unless otherwise specified, the chemical reagents and compounds provided herein below, or their precursors, are available from common commercial chemical vendors, such as Sigma-Aldrich Chemical Co., of St. Louis, Mo.

The invention is further described by the following examples.

EXAMPLE 1

To demonstrate the invention, three variable transmission electrochromic windows were prepared in the shape of a commercial aircraft window (i.e., approximately 18.75 inches high and 11.25 inches wide) by placing two ITO coated glass substrates in a spaced apart parallel arrangement with the ITO coated sides facing each other, each having a conductive silver epoxy dispensed around the perimeter of the substrates. An epoxy seal was dispensed around the perimeter and in between the two substrates and cured. The spaces defined by the two substrates and epoxy seal were then each filled with an electrochromic solution in propylene carbonate, namely: one prior art solution and two examples of the present invention. The respective solutions are provided in Table I below.

TABLE I

| | Prior Art | Example 1 | Example 2 |
|---|---|---|---|
| 2-ethylhexyl viologen $(BF_4)_2$[1] | 278 mM | 30.78 mM | 34.8 mM |
| 5,10-dihydro-dineopentyl phenazine[2] | 22.5 mM | 23.625 mM | 26.5 mM |
| 2,7-di-2-ethylbutyl-5,10-dineopentyl-5,10- dihydrophenazine[3] | 3.25 mM | 4.875 mM | 5.82 mM |
| Decamethyl ferrocene[4] | 0.5 mM | 0.5 mM | 0.5 mM |
| Decamethyl ferrocinium $BF_4$[5] | 1 mM | 1 mM | 1 mM |
| Tinuvin 384[6] | 15 mM | 15 mM | 15 mM |
| Tinuvin PE[7] | 30 mM | 30 mM | 30 mM |
| 10: HEMA-MMA copolymer[8] | 5.50 wt % | 5.50 wt % | 5.50 wt % |
| di-butyltin-dilorate[g] | 0.45 ppm | 0.45 ppm | 0.45 ppm |

[1] Readily commercially available and/or preparation available in U.S. Pat. No. 7 855,821.
[2] Readily commercially available and/or preparation available in U.S. Pat. No. 7 428,091.
[3] 2,7-di-2-ethylbutyl-5,10-dineopentyl-5,10-dihydrophenazine was prepared in an analogous to 2,5,7,10-tetraneopentyl-5,10-dihydrophenazine in example 6 of U.S. Pat. No. 7,428,091 except that 2-ethyl-butanoyl chloride replaced trimethyl acetyl chloride.
[4] Readily commercially available and/or preparation available in U.S. Pat. No. 6,188,505.
[5] Readily commercially available and/or preparation available in U.S. Pat. No. 6,188,505.
[6] Readily commercially available.
[7] Provided herein.
[8] Readily commercially available.
[9] Readily commercially available.

The three windows were set into the openings each with a clear Lexan cover in an 82 inch long by 52 inch wide by 87 inch high booth to allow sunlight to pass through the windows.

Figure 9:
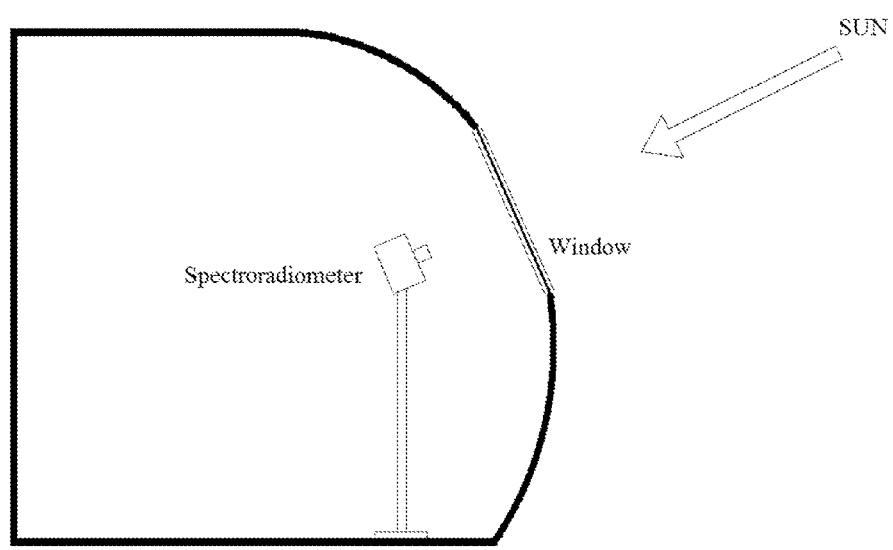
FIG. 9 of the drawings is a cross-sectional schematic representation of an aircraft window system placed in a booth that simulates a fuselage of an aircraft.

Real solar flux measurements of the transmitted sunlight through the electrochromic windows were made in a booth that simulates the mounting position of the electrochromic windows in the fuselage of an aircraft. The solar flux through the electrochromic windows was measured on a clear day at approximately solar noon in lower Michigan in November of 2011. A traceably calibrated spectroradiometer which comprises an Ocean Optics USB-4000 spectrometer (serial# USB4C01772) fitted with a cosine collector sampling port, using a 25 micron aperture slit, a #2 grating (250-800 nm), a detector collection lens and a UV4 window, was calibrated by Ocean Optics to accurately measure spectral Irradiance in Joules/(nm*$m^2$). This spectroradiometer was placed approximately 12 inches from the interior surface of the electrochromic window oriented such that the cosine collector surface was perpendicular to the vector from its surface to the sun and that vector passed through the center of the electrochromic window. The spectroradiometer was mounted on a stand so as to maintain constant location and orientation during the measurements. (See FIG. 9).

Measurements of the solar flux through the electrochromic windows in their bleached state (a/k/a open circuit, zero potential, high transmission state) were then taken. Background signal measurements (detector thermal noise) were collected for the spectroradiometer with its sample port covered prior to measurements of the solar flux through the windows. These backgrounds were mathematically subtracted from the window measurements. The measurement of the solar flux through the electrochromic windows in their fully darkened or low transmission state during normal daylight conditions was complicated by the extremely low flux of light available which required long (15 sec) integration times. The background for the spectroradiometer at these low light levels and long integration times was non-linear and required curve fitting of the irradiance measurement baselines to properly subtract the backgrounds. The spectral irradiance data for each measurement was scaled by the standard eye photopic response and then integrated to give the perceived illuminance as visual lux ($E_v$.)

Figure 10:
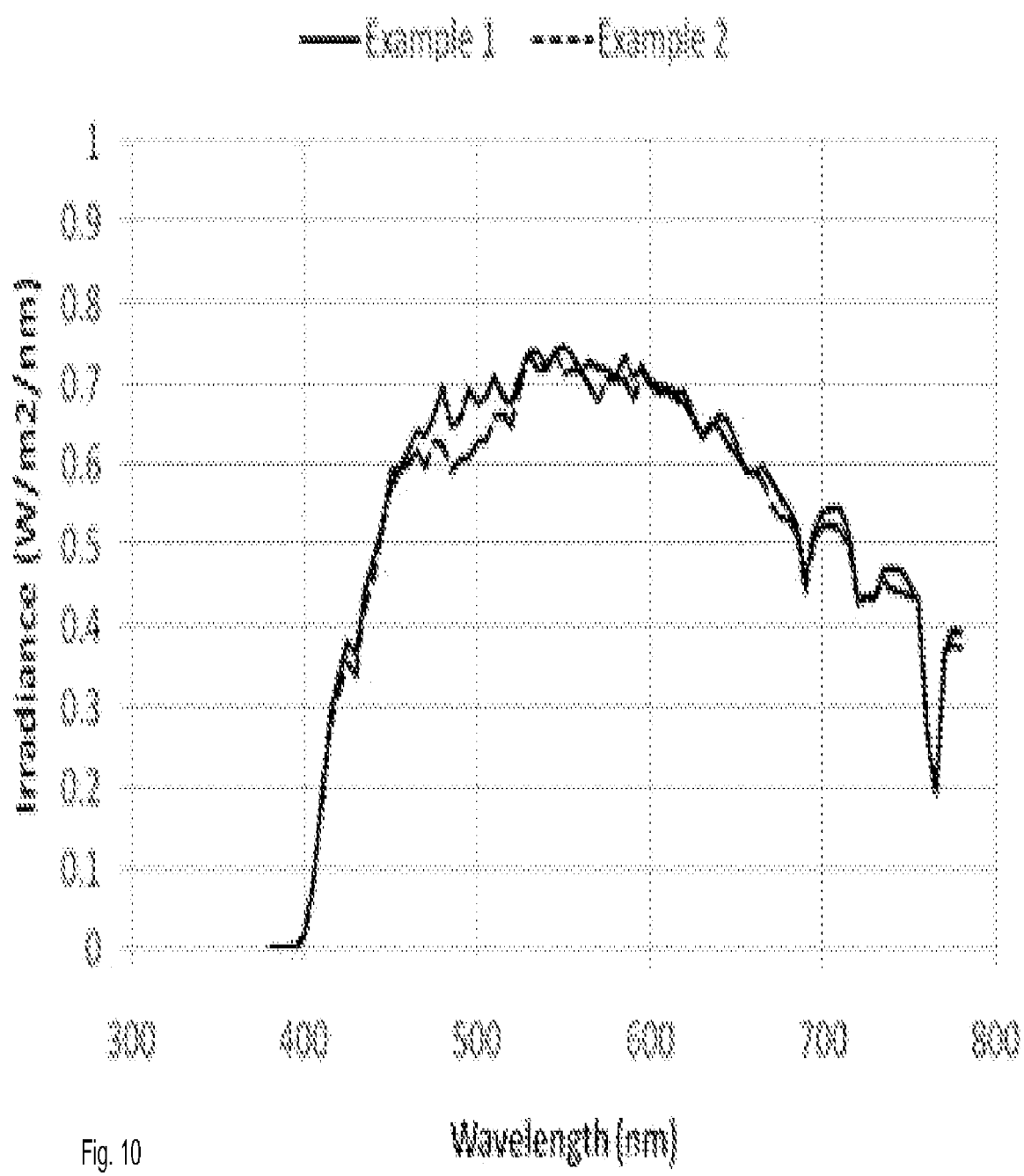
FIG. 10 of the drawings is a two-dimensional plot showing the change in irradiance as a function of wavelength for Examples 1 and 2, in a high transmission state.
Figure 11:
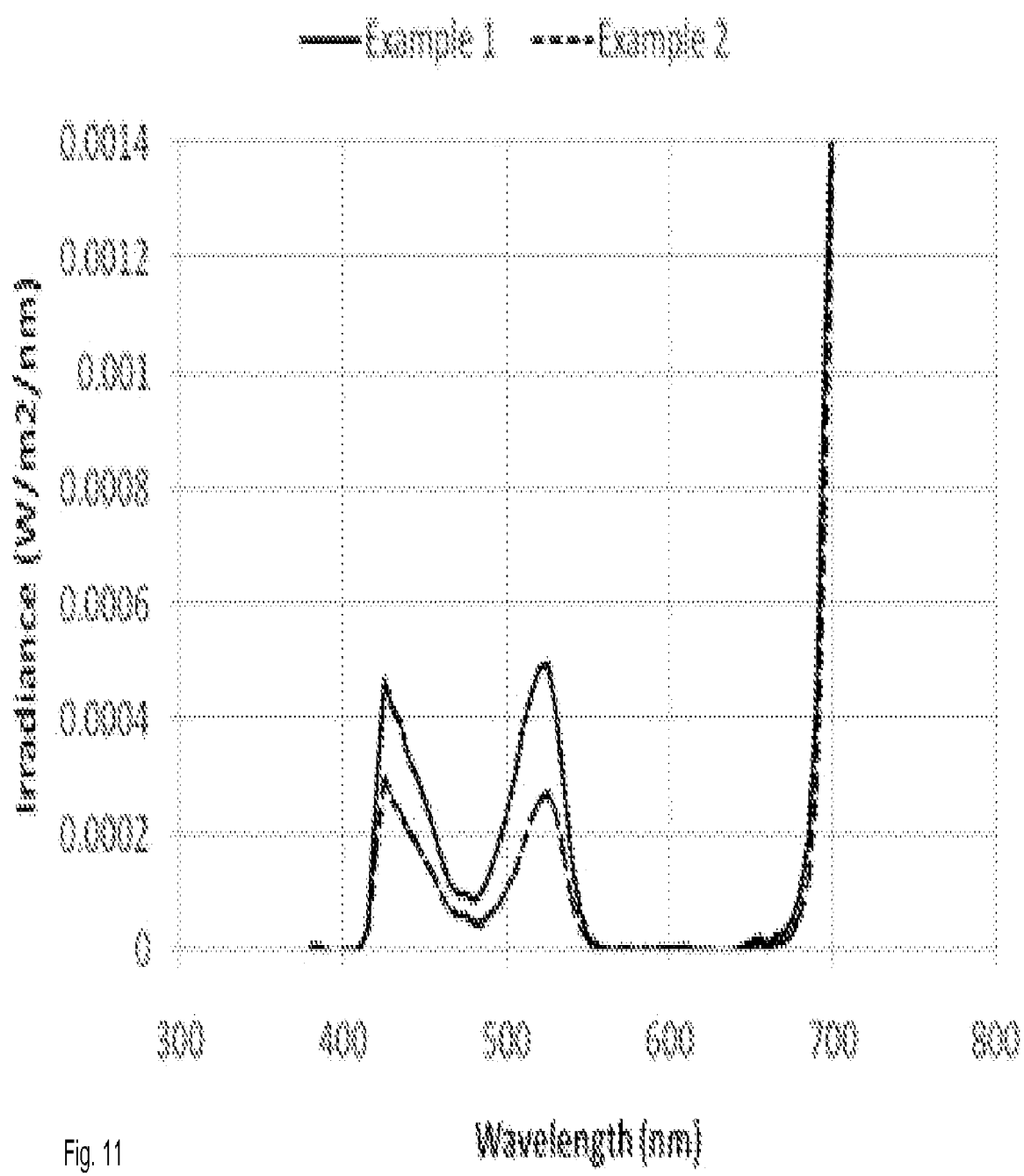
FIG. 11 of the drawings is a two-dimensional plot showing the change in irradiance as a function of wavelength for Examples 1 and 2, while in a low transmission state during normal daylight conditions.

The solar irradiance transmitted through the variable transmission electrochromic windows in the high-transmittance bleached state is shown in FIG. 10. The integrated energy translates to perceived illuminance as 57,131 lux for the prior art window, 55,900 lux for window of Example 1 and 54,225 lux for window of Example 2. The solar irradiances transmitted through the variable transmission electrochromic windows in their low transmission are shown in FIG. 11. The integrated energy translates to perceived illuminance as 36 lux for the prior art window, 9.8 lux for window of Example 1, and 5.4 lux for window of Example 2.

It will be understood that in an aircraft installation, the primary pressure window may include specialty coatings such as those designed to reduce heat load in the cabin. The transmittance of a representative pressure pane described broadly in Aviation Week (May 26, 2011, online article titled "Transforming Transparencies") as two laminated stretched acrylic pieces with a gold coating is calculated using standard optical modeling methods using representative optical constants for the materials to give approximately 75%, is significantly lower than the outer plastic dust cover, approximately 92%, utilized in the booth measurements described above. If the optical effects of the presence of such a representative pressure window are taken into account, the perceived illuminance of the prior art window is reduced to 26 lux while perceived illuminance of the window described as Example 1 is reduced to 7.0 lux and the perceived illuminance of the window described as Example 2 is reduced to 4.1 lux—which is a reduction in perceived illuminance of greater than a factor of six.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed and desired to be secured by Letters Patent of the United States is:

1. A variable transmission electrochromic window, comprising:
   a first substantially transparent substrate having an electrically conductive material associated therewith;
   a second substantially transparent substrate having an electrically conductive material associated therewith;
   an electrochromic medium contained within a chamber positioned between the first and second substrates, the electrochromic medium comprising:
     a solvent;
     an anodic electroactive material;
     a cathodic electroactive material; and
     a cross-linked polymer matrix;
   wherein:
     at least one of the anodic and cathodic electroactive materials is electrochromic; and
     the electrochromic window exhibits an $E_v$ of less than approximately 20 while in a low transmission state during normal daylight conditions.

2. The variable transmission electrochromic window of claim 1, wherein the electrochromic window exhibits an $E_v$ of less than approximately 10 while in a low transmission state during normal daylight conditions.

3. The variable transmission electrochromic window of claim 1, wherein the electrochromic window exhibits an $E_v$ of less than approximately 5 while in a low transmission state during normal daylight conditions.

4. The variable transmission electrochromic window of claim 1, wherein the window is an aircraft window.

5. The variable transmission electrochromic window of claim 1, wherein the electrochromic medium further comprises an anodic color-stabilizing redox buffer, a cathodic color-stabilizing redox buffer, or a mixture of an anodic color-stabilizing redox buffer and a cathodic color-stabilizing redox buffer.

6. The variable transmission electrochromic window of claim 1, wherein the electrochromic medium further comprises a mixture of an anodic color-stabilizing redox buffer and a cathodic color-stabilizing redox buffer.

7. The variable transmission electrochromic window of claim 1, wherein a concentration of the cathodic electroactive material is greater than a concentration of the anodic electroactive material.

8. The variable transmission electrochromic window of claim 1, wherein the cathodic electroactive material comprises a viologen.

9. The variable transmission electrochromic window of claim 8, wherein:
the viologen comprises a 1,1'-dialkyl-4,4'-dipyridinium compound; and
at least one alkyl group of the dialkyl comprises at least 4 carbon atoms and includes less than 2 β hydrogen atoms.

10. The variable transmission electrochromic window of claim 1, wherein the anodic electroactive material comprises a phenazine.

11. The variable transmission electrochromic window of claim 10, wherein:
the phenazine comprises a 5,10-dialkyl-5,10-dihydrophenazine compound; and
at least one alkyl group of the dialkyl comprises at least 4 carbon atoms and is void of any β hydrogen atoms.

12. The variable transmission electrochromic window of claim 10, wherein the phenazine comprises at least one neopentyl group.

13. The variable transmission electrochromic window of claim 1, wherein the first substantially transparent substrate and the second substantially transparent substrate are less than approximately 1.0 mm thick.

14. The variable transmission electrochromic window of claim 1, wherein the first substantially transparent substrate and the second substantially transparent substrate are from about 0.65 mm to 1.0 mm thick.

15. A variable transmission electrochromic window, comprising:
a first substantially transparent substrate having an electrically conductive material associated therewith;
a second substantially transparent substrate having an electrically conductive material associated therewith;
an electrochromic medium contained within a chamber positioned between the first and second substrates, the electrochromic medium comprising:
a solvent;
an anodic electroactive material; and
a cathodic electroactive material;
wherein:
at least one of the anodic and cathodic electroactive materials is electrochromic;
the electrochromic window exhibits an $E_v$ of less than about 20 while in a low transmission state during normal daylight conditions; and
the first substantially transparent substrate, the second substantially transparent substrate, or both the first substantially transparent substrate and the second substantially transparent substrate are less than about 1.0 mm thick.

16. The variable transmission electrochromic window of claim 15, wherein the electrochromic window exhibits an $E_v$ of less than about 10 while in a low transmission state during normal daylight conditions.

17. The variable transmission electrochromic window of claim 15, wherein the electrochromic window exhibits an $E_v$ of less than about 5 while in a low transmission state during normal daylight conditions.

18. The variable transmission electrochromic window of claim 15, wherein the window is an aircraft window.

19. The variable transmission electrochromic window of claim 15, wherein the electrochromic medium further comprises a cross-linked polymer matrix.

20. The variable transmission electrochromic window of claim 15, wherein the electrochromic medium further comprises an anodic color-stabilizing redox buffer, a cathodic color-stabilizing redox buffer, or a mixture of an anodic color-stabilizing redox buffer and a cathodic color-stabilizing redox buffer.

21. The variable transmission electrochromic window of claim 15, wherein the first substantially transparent substrate and the second substantially transparent substrate are from about 0.65 mm to 1.0 mm thick.

* * * * *